Dec. 3, 1957  S. A. MURDOCK  2,815,301
ANTISTATIC SYNTHETIC FIBERS
Filed May 21, 1956
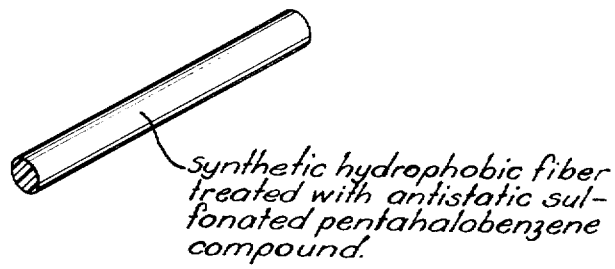
synthetic hydrophobic fiber treated with antistatic sulfonated pentahalobenzene compound.
INVENTOR.
Stanley A. Murdock
BY
Griswold & Burdick
ATTORNEYS

United States Patent Office 2,815,301
Patented Dec. 3, 1957

2,815,301

ANTISTATIC SYNTHETIC FIBERS

Stanley A. Murdock, Concord, Calif., assignor to The Dow Chemical Company, Midland, Mich., a corporation of Delaware Application May 21, 1956, Serial No. 586,102

19 Claims. (Cl. 117—139.5)

This invention relates to a method for treating shaped articles comprised of synthetic hydrophobic polymeric materials, particularly those comprised of polymers and copolymers of acrylonitrile, so as to overcome their propensity for accumulating static electrical charges. It also has reference to the articles resulting from such a treatment.

Polyacrylonitrile and various copolymers of acrylonitrile with other monoethylenically unsaturated monomeric materials, especially those that contain at least about 80 percent by weight of acrylonitrile polymerized in the copolymer molecule, have many attractive properties which make them desirable for employment in various shaped articles including fibers, filaments, yarns, threads (and cloth and fabrics constructed therefrom), ribbons, tapes, foils, films, sheets and the like. Shaped articles from polymers and copolymers of acrylonitrile, however, as well as those from many other synthetic hydrophobic polymeric materials including polyamides such as the nylons and polyesters such as polyethylene terephthalate and the like, exhibit an inordinate capacity for accumulating surface charges of static electricity. This characteristic makes them extremely difficult and unwieldy to manipulate and handle during various manufacturing operations and use applications. It also lessens their attractiveness in other aspects for being employed for many purposes. For example, many individuals may object to the delitescent electrical shocks they may be subject to or the sparks that may be discharged when they serve as the effective grounding means for articles comprised of polymers and copolymers of acrylonitrile and other synthetic hydrophobic polymeric materials when there is a considerable accumulation of electrical charges on the articles. Furthermore, electrostatically charged articles comprised of polymers and copolymers of acrylonitrile and other synthetic hydrophobic polymeric materials display great tendencies to collect dust and dirt and to have undesirably high degrees of soil retentivity. This, of course, limits their adaptability for being utilized in a completely satisfactory manner for many apparel, upholstery, home furnishing, decorative and other uses.

Innumerable materials, treatments and techniques have been proposed, suggested and advanced to overcome or minimize the problems of static electrical charge accumulations on articles comprised of synthetic hydrophobic polymeric materials, particularly polymers and copolymers of acrylonitrile, which hereinafter will be predominantly illustrated with acrylonitrile polymer fibers, which may be referred to as acrylic fibers by way of characterizing their polymeric or copolymeric origin. The known treatments are generally defective or deficient in various particulars. Thus, many materials and finishes intended for application as antistatic agents are not sufficiently substantive for or adherescent on articles comprised of polymers and copolymers of acrylonitrile or other synthetic hydrophobic polymeric materials so that it may be difficult to suitably apply them to such articles and to realize satisfactory or substantial degrees of permanence after their application. Many antistatic agents, for example, are easily susceptible to removal during aqueous manufacturing treatments or subsequent laundering or dry cleaning of the acrylic and other synthetic fiber articles on which they may be applied. Furthermore, some antistatic agents have an undesirable influence on the hand or feel to the touch of the textile materials with which they are utilized. In addition, a great number of the known antistatic materials require that complex procedures be practiced for their application. The cost of their utilization may be significantly amplified thereby. It would be advantageous to provide an improved and more beneficial antistatic treatment for acrylic fibers and for fibers comprised of other synthetic hydrophobic polymeric materials.

Therefore, it is among the principal objects of the present invention to provide a method for treating articles comprised of synthetic hydrophobic polymeric materials, particularly polymers and copolymers of acrylonitrile, to improve their resistivity for developing or accumulating static electrical charges.

It is also among the principal objects of the present invention to provide an antistatic agent that will remain in effective association with acrylic fibers and fibers from other synthetic hydrophobic polymeric materials after its application despite repeated and rigorous subjection to aqueous treatments, washings, laundering and dry cleaning.

It is among the additional objects of the invention to provide articles comprised of synthetic hydrophobic polymeric materials, particularly polymers and copolymers of acrylonitrile, including fibers and the like and cloth and fabrics constructed therefrom, which result from such a treatment.

It is a predominating objective of the present invention to accomplish these intendments without detraction from or deletion of the other desirable characteristics and properties of acrylic and other synthetic fibers and other related articles comprised of synthetic hydrophobic polymeric materials, particularly polymers and copolymers of acrylonitrile.

Still further objects, advantages and benefits of the invention will be apparent in the following description and specification.

According to the invention, shaped articles comprised of synthetic hydrophobic polymeric materials, particularly polymers and copolymers of acrylonitrile, may be rendered less propense to accumulate static electrical charges by treating them with an application of an antistatic agent comprised of a sulfonated pentahalobenzene compound. Advantageously, the antistatic agent can be applied during the manufacturing operations in the course of preparing an acrylic or other synthetic fiber. Articles treated in accordance with the present invention, one of which is illustrated in the accompanying drawing, retain the antistatic sulfonated pentahalobenzene compound, especially when it is in the form of a salt, in a substantially permanent manner throughout normal usage of the material. They have excellent antistatic properties and may be handled and employed readily without difficulties due to accumulations of static electricity. Furthermore, articles in accordance with the present invention retain their essential characteristics, including hand, and have an undiminished receptivity for other desired treatments which may be calculated and intended to enhance other of their properties, including dye-receptivity. The sulfonated pentahalobenzene compound which may beneficially be employed as an antistatic agent does not engender adverse consequences in this regard.

The antistatic agent of the present invention may advantageously be comprised of the free acid or a salt form of the sulfonated pentahalobenzene compound. The term "pentahalobenzene compound," as herein employed, is intended to include pentachlorobenzene and pentabromobenzene derivatives and to be exclusive of fluorine and iodine-containing materials. It is frequently desirable to employ a sulfonated pentachlorobenzene compound in the practice of the invention such as pentachlorobenzene sulfonic acid or salts thereof such as the alkali metal, particularly sodium and potassium, pentachlorobenzene sulfonates; the alkaline earth metal, particularly calcium, pentachlorobenzene sulfonates; the ammonium and quarternary ammonium pentachlorobenzene sulfonates; and the like. Pentachlorobenzene sulfonic acid is a water-soluble compound while its common salts, such as the mentioned varieties, are ordinarily water-insoluble. The antistatic agents of the invention are particularly substantive to various synthetic hydrophobic polymeric materials and, after their application thereto, provide compositions and treated articles which may be washed or scoured under the most rigorous conditions without losing their antistatic characteristics. Pentachlorobenzene sulfonic acid is especially substantive to polymers and copolymers of acrylonitrile.

Any desired amount of the antistatic sulfonated pentahalobenzene compound may be employed on an acrylic fiber or other shaped article comprised of polymers and copolymers of acrylonitrile or of other synthetic hydrophobic polymeric materials. Ususally, it is beneficial to apply an amount between about 0.5 and 5.0 percent by weight of the antistatic agent, based on the dry weight of the shaped article being treated. In many cases, it may be more advantageous for the amount that is used to be between about 1.0 and 2.0 percent by weight.

Various techniques may be utilized for the application of the antistatic agents of the invention. For example, they may frequently be applied from a dispersion or solution using water or some other inert medium as a dispersant vehicle. Thus, in the manner of conventional textile finish application, applicating formulations of the antistatic agent may be applied directly to a running strand of an acrylic or other synthetic polymeric fiber or other shaped article using a liquid jet or spray of the formulation. If desired, applicating rollers and equivalent devices may be utilized for the purpose. It may frequently be more convenient, however, to employ the applicating formulation as an impregnating bath in which the acrylic or other synthetic fiber article, during any stage of its manufacture or subsequent thereto, is immersed in order to pick up or become impregnated with a desired quantity of the antistatic sulfonated pentahalobenzene compound. Cloth and fabric may also be treated in this manner, if desired. It frequently may be preferable to take advantage of the water-soluble forms of the antistatic agents of the invention, such as pentachlorobenzene sulfonic acid, for purposes of application. Thus, an aqueous solution of the free acid may be applied to a shaped synthetic hydrophobic polymeric material, such as an acrylic fiber, and subsequently converted in situ on the shaped article to a water-insoluble salt form of the compound.

The applicating formulations of the antistatic sulfonated pentahalobenzene compounds may often be employed with especial advantage as an impregnating bath wherein some other treatment, such as an orientation by stretching, is being performed in the course of manufacture of the fiber or other shaped article. In such cases, the impregnating bath may often be used with greater benefit at elevated temperatures. Thus, the application, especially in combination with other manufacturing treatments such as orientation by stretching, may be performed at temperatures as high as in the neighborhood of 100° C. The antistatic agent is dried on the acrylic or other synthetic fiber or other shaped article after its application. The drying of a treated fiber or other product may, of course, be accomplished in the normal manner when application of the antistatic copolymer has been made during the course of its manufacture.

The invention will be further illustrated in and by the following examples wherein, unless otherwise indicated, all parts and percentages are to be taken by weight.

*Example 1*

Stoichiometric proportions of free pentachlorobenzene sulfonic acid and dodecyl trimethyl ammonium chloride were reacted to form a dispersion of the resulting quaternary ammonium salt by combining about 2 grams of a sorbitan monolaurate polyoxyalkylene surface active derivative, such as that which may be obtained from the Atlas Powder Company under the trade-name "Tween 20," with about 100 milliliters of a 2 percent aqueous solution of the free acid and reacting the dispersing agent-containing mixture, under rapid agitation, with about 31.1 grams of a 10 percent solution of the dodecyltrimethyl ammonium chloride in a 50 percent aqueous solution of isopropanol. The milky white dispersion that was obtained was then applied to a 2 gram dry weight sample of polyacrylonitrile fibers by employing the dispersed antistatic agent as an impregnating bath in which the fibers were immersed for about 10 seconds at room temperature. The fibers, which were impregnated while in an aquagel condition, were in the form of a 300 filament ribbon-like tow which had been wet spun from an aqueous zinc chloride spinning solution into an aqueous zinc chloride coagulating bath; washed substantially free from zinc chloride; and oriented by hot-stretching while being treated, from aqueous solution, with a dye-assisting adjuvant compound. After being immersed in the dispersion of the antistatic agent, the impregnated fibers were squeezed to move excess liquid and dried for about 7 minutes at about 150° C. The resulting 3 denier dry fiber sample, designated sample "A," had a soft and pleasing hand and an exceptionally white appearance. It was found to contain about 2 percent of the antistatic agent, expressed as pentachlorobenzene sulfonic acid.

Sample "A" was then divided into two portions. One of the portions, designated sample "B," consisting of an amount of about 0.7 grams of the dry treated fibers, was scoured at the boil for 15 minutes in 25 cubic centimeters of a 0.033 percent solution of the non-ionic surface active material known as "Igepal CO433" which is obtainable from the Antara Chemicals division of General Aniline & Film Corp. and is believed to be a nonyl phenoxy polyoxyethylene ethanol type of material. After being scoured, sample "B" was rinsed thoroughly in distilled water and dried at 80° C. Another sample of the dye-assisting adjuvant-containing polyacrylonitrile fibers, which had not been treated with the anti-static agent in accordance with the invention, was similarly scoured, rinsed and dried. This last sample was designated sample "C."

The antistatic values of samples "A," "B" and "C" were then tested and compared with that of scoured wool using a "miniature card" static test device which simulated the action of conventional textile carding apparatus and permitted an electrostatic determination to be made of the quantity of static electricity thereby accumulated on the fibers. The results, presented in the following tabulation as the ratio of the voltage reading obtained with the test device for the sample being tested to the reading for scoured wool under identical conditions, were obtained at 54 percent relative humidity and 73° F. For purposes of comparison, a sample of scoured viscose rayon yarn was also tested under the same conditions.

| Sample | Ratio $\frac{\text{Static Reading of Sample}}{\text{Static Reading of Wool}}$ |
|---|---|
| "A" | less than 0.02. |
| "B" | less than 0.02. |
| "C" | more than 2.0. |
| Scoured Viscose Rayon | about 0.072. |

As is apparent, even after being scoured at the boil, the treated destaticized fiber had excellent antistatic characteristics, being commensurate in this respect to scoured viscose rayon yarn, a fiber which is not generally considered to present difficulties in handling and use due to the problems of static electricity.

*Example II*

About 3 grams, on a dry weight basis, of a wet-spun, oriented polyacrylonitrile fiber in aquagel condition, which was similar to the fiber employed in the first example, was immersed in a 1 percent aqueous solution of pentachlorobenzene sulfonic acid for about 30 seconds, squeezed out by hand, and dried at about 150° C. The thus-treated fiber, designated sample "B," was found to contain about 1 percent of the impregnated sulfonic acid. About half of sample "D" was scoured for 15 minutes at the boil in a 0.5 percent mild soap solution in water. During the scouring, the free sulfonic acid was believed to have been converted in situ to the water-insoluble sodium salt form of the pentachlorobenzene sulfonic acid by reaction with the sodium available in the soap. The scoured and in situ converted sample, designated sample "E," was rinsed several times in distilled water and dried at 80° C. A third sample of the same fiber designated as sample "F," was subjected to the same scouring without being destaticized in accordance with the invention. The antistatic values of the samples as compared to scoured wool, along with a sample of scoured viscose rayon yarn, were then determined on the miniature card tester described in the preceding example at 35 percent relative humidity and 80° F. The results were as follows.

| Sample | Ratio $\frac{\text{Static Reading of Sample}}{\text{Static Reading of Wool}}$ |
| --- | --- |
| "D" | 0.06. |
| "E" | 0.05. |
| "F" | more than 2.0. |
| Scoured Viscose Rayon | 0.12. |

*Example III*

A solution of about 4.2 percent of pentachlorobenzene sulfonic acid in water was reacted with dilute aqueous sodium hydroxide under rapid mechanical agitation until a pH of about 5 was obtained in the resulting dispersion. The sodium pentachlorobenzene sulfonate dispersion was diluted with distilled water until it contained about 2 percent of solids. The thus-obtained dispersion was then used to impregnate polyacrylonitrile fibers similar to those described in Example I by employing the dispersion at a temperature of about 100° C. as a second hot stretch bath in which the fibers, in aquagel condition, were finally oriented after being initially oriented in a preceding water bath. The residence time of the fibers passing through the sodium pentachlorobenzene sulfonate dispersion while being stretched therein was about 4.5 seconds. Upon being withdrawn from the antistatic impregnating stretch bath, the fibers were dried at 150° C. The dried fibers, which contained about 8.5 percent of the antistatic agent, expressed as the free acid, impregnated therein, were very white and had a good hand. They were designated as sample "G."

A portion of sample "G," designated sample "H," was scoured at the boil in a 0.5 percent solution of "Igepal C0433." After being scoured, they were rinsed several times in distilled water and dried at 80° C. A sample of the originally prepared fiber which was not immersed in the antistatic impregnating bath was also obtained and designated sample "I." The samples, along with a sample of scoured viscose rayon yarn, were then tested for their propensity to accumulate electrostatic charges at 38 percent relative humidity and 80° F. using the miniature card tester described in Example I. The results are set forth in the following tabulation.

| Sample | Ratio $\frac{\text{Static Reading of Sample}}{\text{Static Reading of Wool}}$ |
| --- | --- |
| "G" | 0.075. |
| "H" | 0.15. |
| "I" | more than 2.0. |
| Scoured Viscose Rayon | 0.13. |

*Example IV*

About 5 grams of oriented, completely processed and dried, 3 denier polyacrylonitrile fiber was treated at the boil for about 15 minutes in about 200 cubic centimeters of a 4 percent aqueous solution of pentachlorobenzene sulfonic acid. The excess solution was then squeezed from the fiber and the treated sample, designated sample "J" was subjected to a 0.5 percent solution of a mild soap in water for about 15 minutes at a temperature of about 95° C. After the soaping, the polyacrylonitrile fiber was found to contain about 2.1 percent of the antistatic agent, expressed as the free sulfonic acid. Another sample of acrylic fiber, similar to sample "J" but without having been destaticized, was designated sample "K."

About 5 grams of a 3 denier polyamide staple fiber of the type frequently characterized and referred to as being "nylon 66" was given the same treatment as the polyacrylonitrile fiber. The polyamide fiber, designated sample "L," was found to contain about 0.56 percent of the antistatic agent.

All of the samples, including a sample of viscose rayon yarn and an undestaticized sample of the "nylon 66" fiber, were then subjected to five accelerated wash tests in accordance with that specified for A. A. T. C. C. test No. 3A. The antistatic values of the various samples on the miniature card tester at 45 percent relative humidity and 72° F. were as follows.

| Sample | Ratio $\frac{\text{Static Reading of Sample}}{\text{Static Reading of Wool}}$ |
| --- | --- |
| "J" | 0.67. |
| "K" | more than 3.0. |
| "L" | 0.53. |
| Scoured Viscose Rayon | 0.09. |
| Untreated Nylon | more than 3.0. |

Similar excellent results may be obtained when sulfonated pentabromobenzene compounds are employed as antistatic agents and when there are analogous antistatic treatments made on other shaped articles including films and cloth and fabric made from fibers of synthetic hydrophobic polymeric materials, including polyester materials.

The advantages of the present invention may be brought into sharper focus by comparison of the foregoing excellent results with those that are obtained with other known sulfonic group-containing materials that are proposed for antistatic treatment of synthetic hydrophobic polymeric materials. Although many sulfonic group-containing materials are effective antistatic materials, they are frequently susceptible to easy removal under such extractive conditions as may obtain during various aqueous treatments, laundering or dry cleaning.

By way of illustration, one of the suggested procedures of U. S. Patent No. 2,700,001 was conducted to antistatically treat a polyacrylonitrile fiber which, when tested in an untreated condition on the miniature card tester described above at 26 percent relative humidity and 75° F., generated about 2500 volts of static potential as measured by an electrometer. (In comparison, under the same conditions, scoured viscose rayon yarn generated 200 volts and scoured wool about 1600 volts.) According to the general procedure of U. S. Patent No. 2,700,001, which is not in accordance with that of the present invention, a commercially available sample of sulfonated polystyrene similar to that which is available from the Monsanto Chemical Company under the trade-name "Lustrex 770" was reacted with dodecyl trimethyl ammonium chloride, similar to that which may be obtained from Armour & Co. under the trade-name "Arquad 12," to obtain an emulsified product containing about 1.3 percent by weight of the dispersed sulfonated agent. Various quantities of the agent were padded on separate 30 gram samples, designated samples "W" through "Z," of the above acrylic fiber. After being dried at 80° C., the treated samples were tested on the miniature card device under the same conditions as the untreated fibers mentioned above and found to generate the following voltages.

| Sample | Percentage by Weight of Agent on Acrylic Fiber | Static Reading In Volts After Carding Test |
| --- | --- | --- |
| "W" | 0.3 | 1,040 |
| "X" | 0.6 | 760 |
| "Y" | 1.3 | 300 |
| "Z" | 2.6 | 200 |

As is apparent, the antistatic treatment was beneficial on the acrylic fibers. However, the effect was found to be only temporary. When samples "W" through "Z" were scoured for 15 minutes at the boil in an aqueous solution of a nonionic detergent, all of the agent was removed from the treated fibers, as evidenced by a negative showing of sulfur upon analysis of the scoured samples. Furthermore, when the scoured samples "W" through "Z" were retested on the miniature card device, they were found to have completely lost their antistatic characteristics, as evidenced by their accumulation of about 2500 volts each under the same test conditions as employed for the untreated acrylic fiber.

Various changes in the practice of this invention may readily be made without substantially departing from its spirit or scope. It is to be understood, therefore, that all of the foregoing be interpreted as being merely illustrative and in no sense or manner limiting or restrictive of the invention as it is particularly pointed out and defined in the appended claims.

What is claimed is:

1. Antistatic treatment for a shaped article comprised of a synthetic hydrophobic polymeric material which comprises applying to the shaped article a sulfonated pentahalobenzene compound selected from the group consisting of sulfonated pentachlorobenzene compounds and sulfonated pentabromobenzene compounds.

2. The treatment of claim 1 wherein the shaped article is comprised of an acrylonitrile polymer.

3. The treatment of claim 1 wherein the sulfonated pentahalobenzene compound is a sulfonated pentachlorobenzene compound.

4. The treatment of claim 1 wherein the sulfonated pentahalobenzene compound is pentachlorobenzene sulfonic acid.

5. The treatment of claim 1 wherein the sulfonated pentahalobenzene compound is sodium pentachlorobenzene sulfonate.

6. The treatment of claim 1 wherein the sulfonated pentahalobenzene compound is a quaternary ammonium pentachlorobenzene sulfonate.

7. The treatment of claim 1 wherein between about 0.5 and 5.0 percent by weight of the sulfonated pentahalobenzene compound is applied to the shaped article, based on the weight of the shaped article.

8. The treatment of claim 1, wherein between about 1.0 and 2.0 percent by weight of the sulfonated pentahalobenzene compound is applied to the shaped article, based on the weight of the shaped article.

9. The treatment of claim 1 wherein the sulfonated pentahalobenzene compound is applied from a liquid dispersion and including the step of drying the shaped article after application of the sulfonated pentahalobenzene compound.

10. The treatment of claim 1 wherein the sulfonated pentahalobenzene compound is applied in aqueous solution as a water-soluble free acid compound and including the steps of converting the free acid form of the sulfonated pentahalobenzene compound in situ in the shaped article to a water-insoluble salt compound and subsequently drying the treated shaped article.

11. The treatment of claim 1 wherein the shaped article is comprised of an acrylonitrile polymer in aquagel condition and including the steps of applying the sulfonated pentahalobenzene compound from a liquid dispersion by immersing the shaped article therein and subsequently drying the shaped article after application of the sulfonated pentahalobenzene compound.

12. The treatment of claim 1 wherein the shaped article is comprised of an acrylic fiber in aquagel condition and including the steps of applying the sulfonated pentahalobenzene compound from a liquid dispersion by immersing the fiber therein and subsequently drying the fiber after application of the sulfonated pentahalobenzene compound.

13. A treatment in accordance with the treatment set forth in claim 12 wherein the sulfonated pentahalobenzene compound is applied from a liquid dispersion at a temperature in the neighborhood of 100° C. while said fiber is being oriented by being stretched therein.

14. A shaped article comprising a synthetic hydrophobic polymeric material which is characterized in being substantially free from propensity to accumulate static electrical charges, said article having a sulfonated pentahalobenzene compound selected from the group consisting of sulfonated pentachlorobenzene compounds and sulfonated pentabromobenzene compounds applied thereto as an antistatic agent.

15. The article of claim 14 wherein the sulfonated pentahalobenzene compound is a sulfonated pentachlorobenzene compound.

16. The article of claim 15 wherein between about 0.5 and 5.0 percent by weight of the antistatic sulfonated pentahalobenzene compound is applied thereto, based on the dry weight of the shaped article.

17. An acrylic fiber article in accordance with claim 14.

18. A polyamide fiber article in accordance with claim 14.

19. A polyester fiber article in accordance with claim 14.

References Cited in the file of this patent
UNITED STATES PATENTS 2,700,001     Cohen et al. _____ Jan. 18, 1955

U. S. DEPARTMENT OF COMMERCE
PATENT OFFICE

CERTIFICATE OF CORRECTION

Patent No. 2,815,301                                December 3, 1957

Stanley A. Murdock

It is hereby certified that error appears in the printed specification of the above numbered patent requiring correction and that the said Letters Patent should read as corrected below.

Column 5, line 15, for sample "B," was read -- sample "D", was --.

Signed and sealed this 6th day of May 1958.

(SEAL)
Attest:
KARL H. AXLINE
Attesting Officer

ROBERT C. WATSON
Commissioner of Patents